US010268861B2

(12) United States Patent
Li et al.

(10) Patent No.: US 10,268,861 B2
(45) Date of Patent: *Apr. 23, 2019

(54) SCREEN MODULE, FINGERPRINT ACQUISITION METHOD, AND ELECTRONIC DEVICE

(71) Applicant: Xiaomi Inc., Beijing (CN)

(72) Inventors: Guosheng Li, Beijing (CN); Anyu Liu, Beijing (CN); Lei Tang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,788

(22) Filed: Nov. 10, 2016

(65) Prior Publication Data

US 2017/0140201 A1     May 18, 2017

(30) Foreign Application Priority Data

Nov. 16, 2015    (CN) .......................... 2015 1 0784633

(51) Int. Cl.
*G06K 9/00* (2006.01)
*G06F 3/041* (2006.01)

(52) U.S. Cl.
CPC ......... *G06K 9/00013* (2013.01); *G06F 3/041* (2013.01); *G06F 3/0414* (2013.01);
(Continued)

(58) Field of Classification Search
CPC ....... G06T 2200/24; G06T 2207/30004; G06T 7/73; G06F 3/0488; G06F 2203/04104;
(Continued)

(56) References Cited

U.S. PATENT DOCUMENTS 5,825,924 A * 10/1998 Kobayashi ......... G06K 9/00067
382/125
5,828,773 A * 10/1998 Setlak .................. G06K 9/0002
382/126
(Continued)

FOREIGN PATENT DOCUMENTS

CN          1283833 A     2/2001
CN        104850292 A     8/2015
(Continued)

OTHER PUBLICATIONS

English Translation of International Preliminary Report on Patentability dated May 22, 2018 for International Application No. PCT/CN2016/101296.
(Continued)

*Primary Examiner* — Jingge Wu
(74) *Attorney, Agent, or Firm* — Jun He Law Offices P.C.; James J. Zhu (57) ABSTRACT

A screen module, a fingerprint acquisition method, and an electronic device are provided. The screen module includes: a fingerprint unit comprising a plurality of fingerprint sensors, which are located in a content display area of the screen module and configured to perform fingerprint acquisition; a processing component connected with the fingerprint unit, the processing component being configured to, after a triggering operation of a user's finger on the content display area is detected, actuate fingerprint sensors in a scanning area corresponding to the triggering operation to acquire fingerprint data of the user in the scanning area; and data transmission lines connected to the plurality of fingerprint sensors, and configured to transmit fingerprint data acquired by the fingerprint sensors in the scanning area to the processing component.

15 Claims, 6 Drawing Sheets

(52) U.S. Cl.
CPC .. *G06K 9/0002* (2013.01); *G06F 2203/04104* (2013.01); *G06F 2203/04105* (2013.01); *G06F 2203/04106* (2013.01)

(58) Field of Classification Search
CPC ........... G06K 9/00006; G06K 9/00067; G06K 9/00087; G06K 9/0008; G06K 15/005; G06K 2009/0006; G06K 9/00013; G06K 9/00228; G06K 9/002
See application file for complete search history.

(56) References Cited

U.S. PATENT DOCUMENTS

| | | | | |
|---|---|---|---|---|
| 6,031,942 | A * | 2/2000 | Nakayama | G06K 9/00087 382/124 |
| 8,810,367 | B2 * | 8/2014 | Mullins | G06F 21/32 340/5.53 |
| 9,489,127 | B2 * | 11/2016 | Kim | G06F 3/041 |
| 2006/0012570 | A1 * | 1/2006 | Yumoto | G06F 3/03547 345/157 |
| 2012/0242635 | A1 * | 9/2012 | Erhart | G06F 1/1626 345/207 |
| 2013/0076485 | A1 * | 3/2013 | Mullins | G06F 21/32 340/5.83 |
| 2013/0208103 | A1 * | 8/2013 | Sands | G06F 21/31 348/78 |
| 2014/0294261 | A1 * | 10/2014 | Abe | G06K 9/00006 382/124 |
| 2014/0298276 | A1 * | 10/2014 | Yokoyama | G06F 1/3265 715/863 |
| 2014/0333328 | A1 * | 11/2014 | Nelson | G06F 3/044 324/663 |
| 2014/0354556 | A1 * | 12/2014 | Alameh | G06F 21/32 345/173 |
| 2014/0354597 | A1 * | 12/2014 | Kitchens, II | G06F 1/3215 345/175 |
| 2015/0074615 | A1 * | 3/2015 | Han | G06K 9/00033 715/863 |
| 2015/0154437 | A1 * | 6/2015 | Aoki | G06K 9/0008 382/124 |
| 2015/0177884 | A1 * | 6/2015 | Han | G06F 3/044 345/174 |
| 2015/0363038 | A1 * | 12/2015 | Luo | G06F 3/0488 345/173 |
| 2016/0154956 | A1 * | 6/2016 | Fadell | G06F 21/316 726/19 |
| 2017/0140201 | A1 * | 5/2017 | Li | G06F 3/0414 |
| 2017/0169277 | A1 * | 6/2017 | Benkley, III | G06K 9/00026 |
| 2017/0300682 | A1 * | 10/2017 | Alten | G06F 21/32 |
| 2018/0081490 | A1 * | 3/2018 | Wang | G06F 3/0418 |

FOREIGN PATENT DOCUMENTS

| | | |
|---|---|---|
| CN | 104932753 | 9/2015 |
| CN | 104932753 A | 9/2015 |
| CN | 105184228 A | 12/2015 |
| CN | 105488464 A | 4/2016 |
| EP | 2178026 A1 | 4/2010 |

OTHER PUBLICATIONS

International Preliminary Report on Patentability dated May 22, 2018 for International Application No. PCT/CN2016/101296.
International Search Report of PCT/CN2016/101296.
Pranav Koundinya et al., "Support for both touch sensing and fingerprint scan with in-cell capacitive LCD", Optomechatronic Micro/Nano Devices and Components III: Oct. 8-10, 2007, Lausanne, Switzerland, May 21, 2014, pp. 91000Y-91000Y, vol. 9100, SPIE, Bellingham, Wash.
Extended European Search Report of EP 16199179.9.

* cited by examiner

SCREEN MODULE, FINGERPRINT ACQUISITION METHOD, AND ELECTRONIC DEVICE

CROSS REFERENCE TO RELATED APPLICATION

This application is based on and claims the priority of the Chinese patent application No. 201510784633.0, filed on Nov. 16, 2015, which is incorporated herein by reference in its entirety.

TECHNICAL FIELD

The present disclosure is related to the field of fingerprint acquisition technology, and more particularly to a screen module, a fingerprint acquisition method, and an electronic device.

BACKGROUND

More and more mobile devices are equipped with fingerprint sensors. By acquiring and recognizing user fingerprints, it is possible to distinguish users' identities, so that turning on/off of functions of the mobile devices may be controlled more conveniently. Typically, a scanning circuit scans fingerprint data through the whole area of a touch screen of a mobile device. As the area of the touch screen is large, scanning time is relatively long, and accordingly, power consumption of the scanning circuit is high.

SUMMARY

According to a first aspect of the embodiments of the present disclosure, there is provided a screen module. The screen module includes: a fingerprint unit comprising a plurality of fingerprint sensors which are located in a content display area of the screen module, and are configured to perform fingerprint acquisition; a processing component connected with the fingerprint unit, the processing component being configured to, after a triggering operation of a user's finger on the content display area is detected, actuate fingerprint sensors in a scanning area corresponding to the triggering operation to acquire fingerprint data of the user in the scanning area; and data transmission lines connected to the plurality of fingerprint sensors and the processing component, and configured to transmit the fingerprint data acquired by the fingerprint sensors in the scanning area to the processing component.

According to a second aspect of the embodiments of the present disclosure, there is provided a fingerprint acquisition method applied to a screen module according to the above embodiments. The method includes: detecting a triggering operation of a user's finger on a content display area of the screen module; determining a fingerprint scanning area according to a triggered area corresponding to the triggering operation; and actuating corresponding fingerprint sensors in the scanning area to perform fingerprint acquisition in the scanning area.

According to a third aspect of the embodiments of the present disclosure, there is provided an electronic device. The electronic device includes: a processor; and a memory configured to store instructions executable by the processor. The processor is configured to: detect a triggering operation of a user's finger on a content display area of the screen module; determine a fingerprint scanning area according to a triggered area corresponding to the triggering operation; and actuate corresponding fingerprint sensors in the scanning area to perform fingerprint acquisition in the scanning area.

It should be understood that both the foregoing general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
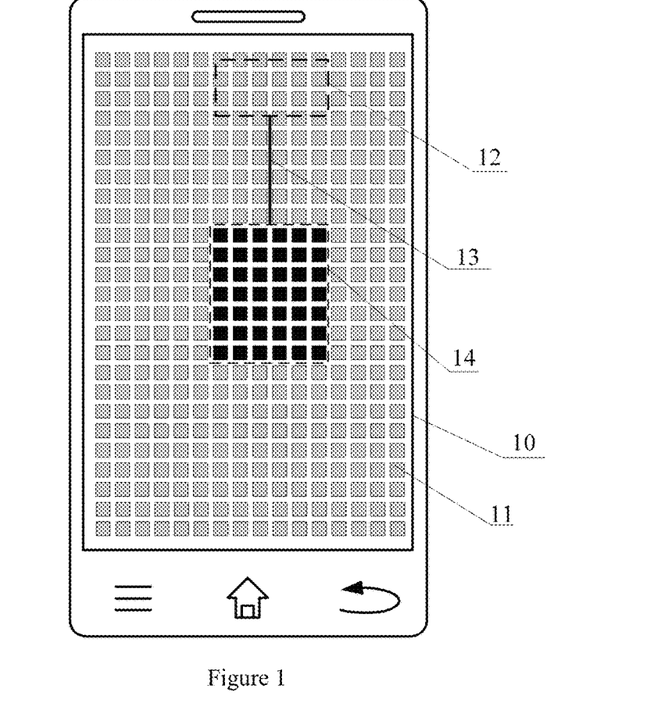
FIG. 1 is a schematic structure diagram of a screen module according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims FIG. 1 is a schematic structure diagram of a screen module according to an exemplary embodiment of the present disclosure. As shown in FIG. 1, the screen module may include a fingerprint unit, a processing component 12 and data transmission lines 13.

The fingerprint unit includes a plurality of fingerprint sensors 11, which are located in a content display area 10 of the screen module and are configured to perform fingerprint acquisition. In an embodiment, the fingerprint sensors 11 may be made of a transparent material so as not to affect displaying of content by an LCD display module 15 (shown in FIG. 2). In an embodiment, the content display area 10 refers to an area on the screen module which is used for realizing a content display function, such as a viewable area (VA) corresponding to the LCD display module of the screen module.

The processing component 12 is connected with the fingerprint unit, and is configured to, after a triggering operation of a user's finger on the content display area 10 is detected, actuate fingerprint sensors in a scanning area 14 corresponding to the triggering operation to acquire fingerprint data of the user in the scanning area.

The data transmission lines 13 are connected to the plurality of fingerprint sensors 11 and the processing component 12, and are configured to transmit the fingerprint data acquired by the fingerprint sensors in the scanning area to the processing component.

In an embodiment, the fingerprint sensors 11 in the screen module correspond to the data transmission lines 13 respectively. Each fingerprint sensor 11 may perform fingerprint acquisition for a user at any time, and transmit the acquired fingerprint data to the processing component 12 via the corresponding data transmission line 13.

In another embodiment, in order to reduce the number of the data transmission lines 13 and to simplify the wiring, a data transmission line 13 may be shared by a plurality of fingerprint sensors 11. That is, the number of the data transmission lines 13 in the screen module is less than that of the fingerprint sensors 11. As the number of the data transmission lines 13 is smaller than that of the fingerprint sensors, the plurality of fingerprint sensors which share the same data transmission line 13 need to be multiplexed time-divisionally to transmit their respective acquired fingerprint data. Thus, it is required to control times for the fingerprint sensors 11 to use the data transmission line 13.

In the present embodiment, the plurality of fingerprint sensors 11 are arranged in the content display area 10 of the screen module, so that after a triggering operation of a user's finger on the content display area is detected, the processing component 12 actuates fingerprint sensors in a scanning area corresponding to the triggering operation to acquire fingerprint data of the user in the scanning area. As such, partial scanning of the content display area 10 is realized, fingerprint scanning through the whole content display area is avoided, scanning time for the fingerprint sensors is shortened, and power consumption of the fingerprint unit is greatly reduced. In addition, as the fingerprint sensors 11 are arranged in the screen module, it is not necessary to additionally arrange a stack structure on a physical button of a mobile device, thereby facilitating structural simplification and complexity reduction of the mobile device.

Figure 2:
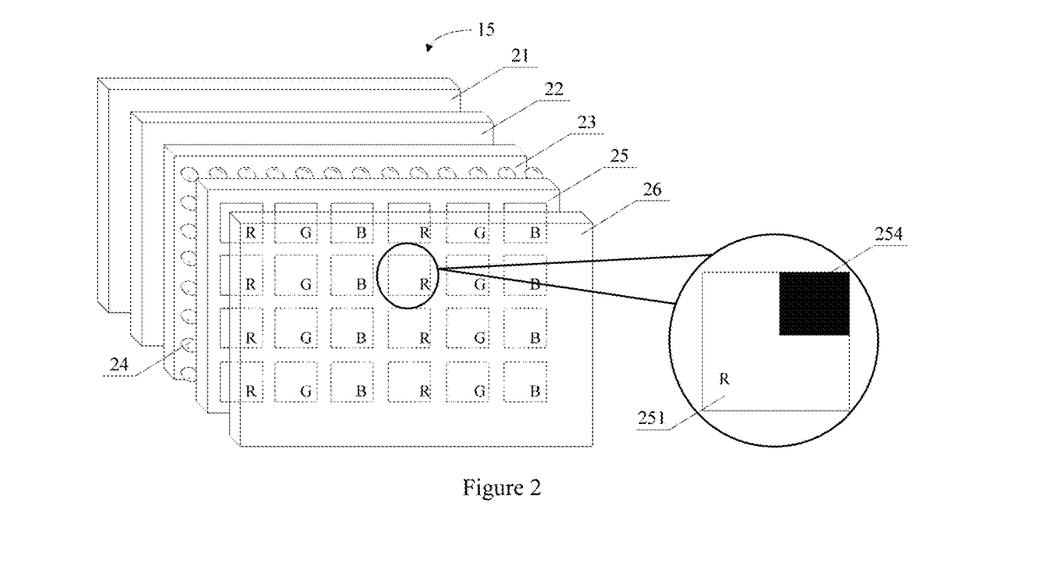
FIG. 2 is a schematic perspective diagram of an LCD display module of a screen module according to an exemplary embodiment of the present disclosure.

FIG. 2 is a schematic perspective diagram of an LCD display module of a screen module according to an exemplary embodiment of the present disclosure. As shown in FIG. 2, the LCD display module 15 of the screen module may include a layered structure including a backlight 21, a lower polarizer 22, an array glass substrate 23, a liquid crystal layer 24, a color filter 25 and an upper polarizer 26. Sub-pixels such as red (R) sub-pixels, green (G) sub-pixels and blue (B) sub-pixels are formed on the color filter 25.

Referring to the partially enlarged drawing in FIG. 2 where a red sub-pixel is taken as an example, in a whole area of the red sub-pixel, only a lower left pixel area 251 is used for displaying a corresponding red content, while a black matrix (BM) area 254 at an upper right corner (which is taken as an example and may also be some other location) is not used for displaying content.

Therefore, projections of fingerprint sensors 11 in the vertical direction may be arranged to fall within those of the BM areas 254 in the sub-pixels of the LCD display module 15 in the vertical direction, so as not to affect normal displaying of content by the LCD display module 15.

Figure 3:
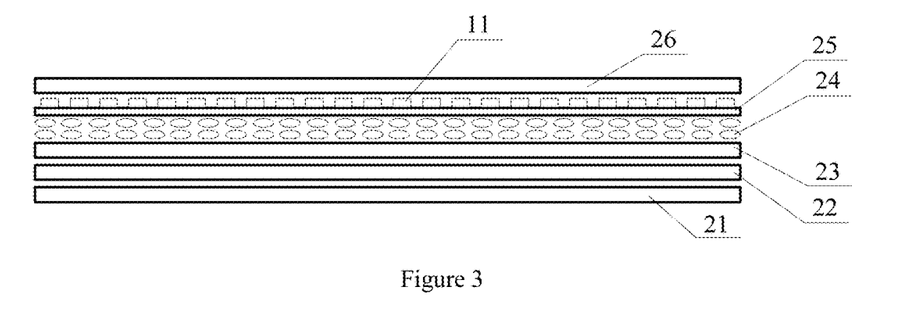
FIG. 3 is a schematic structure diagram of an LCD display module of a screen module according to an exemplary embodiment of the present disclosure.

FIG. 3 is a schematic structure diagram of a LCD display module of a screen module according to an exemplary embodiment of the present disclosure. As shown in FIG. 3, if projections of the fingerprint sensors 11 in the vertical direction fall within those of the BM areas 254 in the sub-pixels of the LCD display module 15 in the vertical direction, the fingerprint sensors 11 may be directly arranged on the surface of the color filter 25 and located in the BM areas 254 (which is shown in FIG. 2, but is not shown in FIG. 3), and correspond to multiple sub-pixels on the color filter respectively. As the fingerprint sensors 11 are arranged inside the LCD display module 15, the assembling process such as adhering the LCD display module 15 with other components will not be affected.

Figure 4:
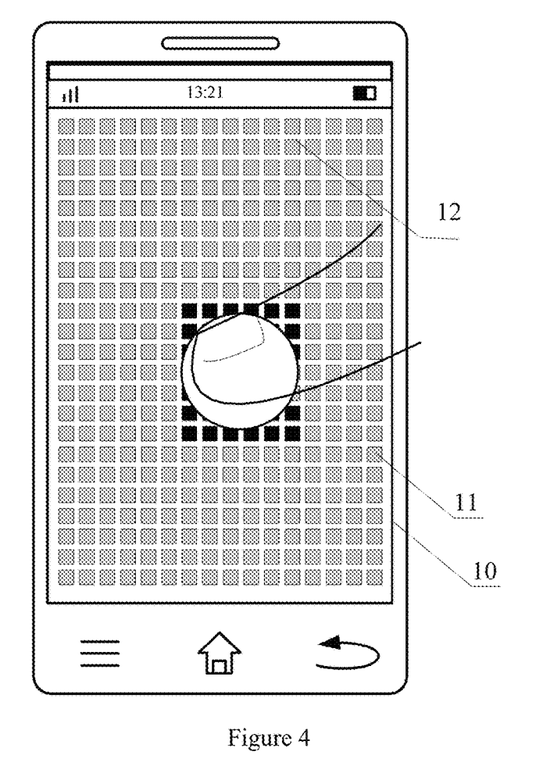
FIG. 4 is a schematic structure diagram of a screen module according to another exemplary embodiment of the present disclosure.
Figure 5:
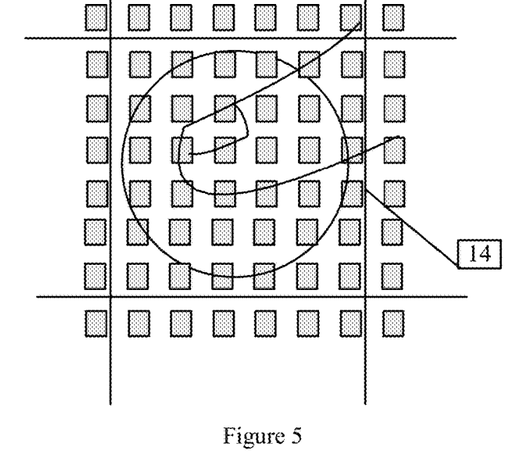
FIG. 5 is a schematic partial view of fingerprint sensors on a screen module according to yet another exemplary embodiment of the present disclosure.

FIG. 4 is a schematic structure diagram of a screen module according to another exemplary embodiment of the present disclosure. FIG. 5 is a partial view of fingerprint sensors on a screen module according to yet another exemplary embodiment of the present disclosure. As shown in FIGS. 4 and 5, the screen module may include a plurality of fingerprint sensors 11 which are arranged in a content display area 10 of the screen module. Via a triggering detection structure on the screen module, a triggering operation of a user's finger on the content display area 10 and a scanning area corresponding to the triggering operation are detected. After the triggering operation of the user's finger on the content display area 10 is detected, a processing component 12 may determine a scanning area 14 corresponding to the triggering operation, and switch fingerprint sensors in the scanning area 14 from a normally-closed state to an actuated state to perform partial scanning of fingerprint in the scanning area 14.

In an embodiment, the triggering detection structure includes a touch function component, wherein the triggering operation is a touch operation detected by the touch function component. In another embodiment, the triggering detection structure includes a pressure detection component, wherein the triggering operation is a pressing operation detected by the pressure detection component. Thus, the triggering operation may be implemented by clicking, swiping on or touching the content display area 10 using a finger.

Compared with technical solutions in the related arts wherein fingerprint sensors 11 are arranged on a back surface or front keys of a mobile device, the fingerprint sensors are arranged in a content display area 10 in the present disclosure. As such, when a finger triggers the content display area 10, fingerprint acquisition is performed only on a scanning area corresponding to the triggering operation, thereby avoiding fingerprint scanning through the entire display content area 10 and greatly reducing the power consumption of the fingerprint unit. Moreover, since the fingerprint sensors 11 are located in the content display area 10 of the screen module, function areas for "Fingerprint Acquisition" and "Content Display" are overlapped and there is no need to additionally occupy a function area on the mobile device, thereby facilitating reduction of length and thickness of the mobile device and further lightening and thinning of the mobile device.

Figure 6:
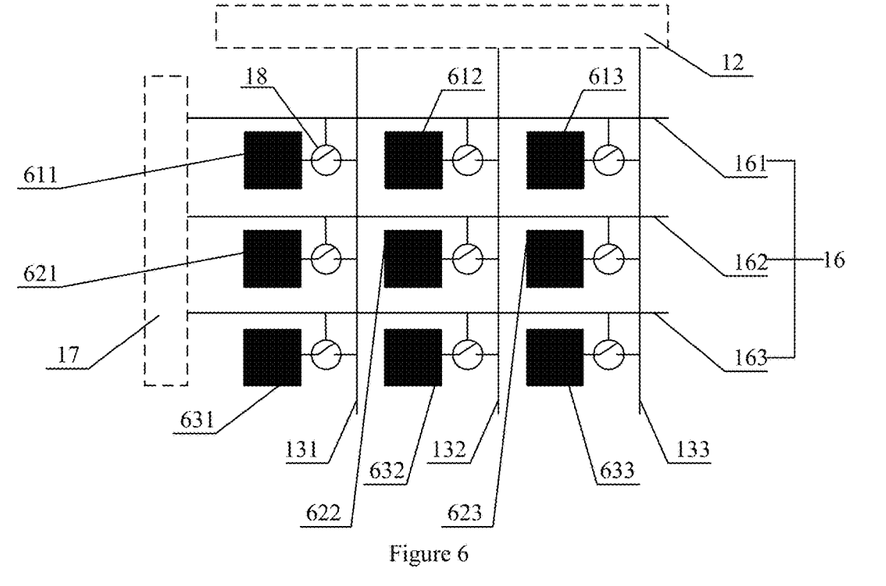
FIG. 6 is a schematic diagram illustrating arrangement of fingerprint sensors according to an exemplary embodiment of the present disclosure.

FIG. 6 is a schematic diagram illustrating arrangement of fingerprint sensors according to an exemplary embodiment of the present disclosure. As shown in FIG. 6, an example in which fingerprint sensors 11 on the screen module are sequentially arranged in respective edge directions of the screen module is taken for illustrative description. A fingerprint sensor 611, a fingerprint sensor 612 and a fingerprint sensor 613 are arranged in a first line along a first edge direction (i.e., a lateral edge direction); a fingerprint sensor 621, a fingerprint sensor 622, and a fingerprint sensor 623 are arranged in a second line along the lateral edge direction; and a fingerprint sensor 631, a fingerprint sensor 632 and a fingerprint sensor 633 are arranged in a third line along the lateral edge direction. The fingerprint sensor 611, the fingerprint sensor 621, and the fingerprint sensor 631 are arranged in a first row along a second edge direction (i.e., a longitudinal edge direction); the fingerprint sensor 612, the fingerprint sensor 622 and the fingerprint sensor 632 are arranged in a second row along the longitudinal edge direction; and the fingerprint sensor 613, the fingerprint sensor 623 and the fingerprint sensor 633 are arranged in a third row along the longitudinal edge direction.

As shown in FIG. 6, the screen module may further include gating control lines 16. In the present embodiment, by taking the gating control lines 16 including a gating control line 161, a gating control line 162 and a gating control line 163 as an example, one ends of the gating control lines 16 are connected to the nine fingerprint sensors 611-613, 621-623 and 631-633, and the other ends of the gating control lines 16 are connected to a control component 17.

In this embodiment, if fingerprint sensors 11 are connected to three data transmission lines including a data transmission line 131, a data transmission line 132 and a data transmission line 133 (for example, the fingerprint sensor 611, the fingerprint sensor 621 and the fingerprint sensor 631 are each connected to the data transmission line 131), then a gating control line 161, a gating control line 162 and a gating control line 163 may control the fingerprint sensor 611, the fingerprint sensor 621 and the fingerprint sensor 631 to be connected or disconnected with the data transmission line 131 according to control instructions from the control component 17, so that the data transmission line 131 may be connected with only one of the fingerprint sensors 611, 621 and 631 at a time.

As shown in FIG. 6, output ends of the plurality of fingerprint sensors 11 may be connected to data transmission lines corresponding to switches via the switches, and gating control lines may be connected to control ends of the switches. For example, a switch 18 is connected to the data transmission line 131, and the gating control line 161 may be connected to the control end (which is an upper end shown in FIG. 6) of the switch 18 to control turning on/off of the switch 18.

In an embodiment, as shown in FIG. 6, each row of fingerprint sensors arranged in a first edge direction of the screen module are connected to a data transmission line corresponding to the row of fingerprint sensors in the first edge direction of the screen module; and each line of fingerprint sensors arranged in a second edge direction of the screen module are connected to a gating control line corresponding to the line of the fingerprint sensors arranged in the second edge direction. The first edge direction is perpendicular to the second edge direction. In FIG. 6, the first edge direction is the longitudinal direction, and the second edge direction is the lateral direction. For example, the control component 17 may control the gating control line 161, the gating control line 162 and the gating control line 163 to be connected sequentially. When the gating control line 161 is connected while the gating control lines 162 and 163 are disconnected, the fingerprint sensor 611, the fingerprint sensor 612 and the fingerprint sensor 613 perform data transmission via the data transmission line 131, the data transmission line 132 and the data transmission line 133 respectively. When the gating control line 162 is connected while the gating control lines 161 and 163 are disconnected, the fingerprint sensor 621, the fingerprint sensor 622 and the fingerprint sensor 623 perform data transmission via the data transmission lines 131, 132 and 133 respectively. When the gating control line 163 is connected while the gating control lines 161 and 162 are disconnected, the fingerprint sensor 631, the fingerprint sensor 632 and the fingerprint sensor 633 perform data transmission via the data transmission lines 131, 132 and 133 respectively.

Of course, FIG. 6 is only an exemplary embodiment, and the plurality of fingerprint sensors may be arranged in any manner. Accordingly, data transmission lines and gating control lines also need to be adjusted, which will not be limited by the present disclosure.

It should be noted that the processing component 12 or the control component 17 in the present disclosure may be a single processing chip such as a microcontroller unit (MCU) chip, or may be a module formed by a plurality of components capable of performing processing or control functions, or even may be a chip having functions of the processing component 12 and the control component 17, which will not be limited by the present disclosure.

Based on the screen module described in the above embodiments, the present disclosure also provide a corresponding fingerprint acquisition method which will be described in detail below.

Figure 7:
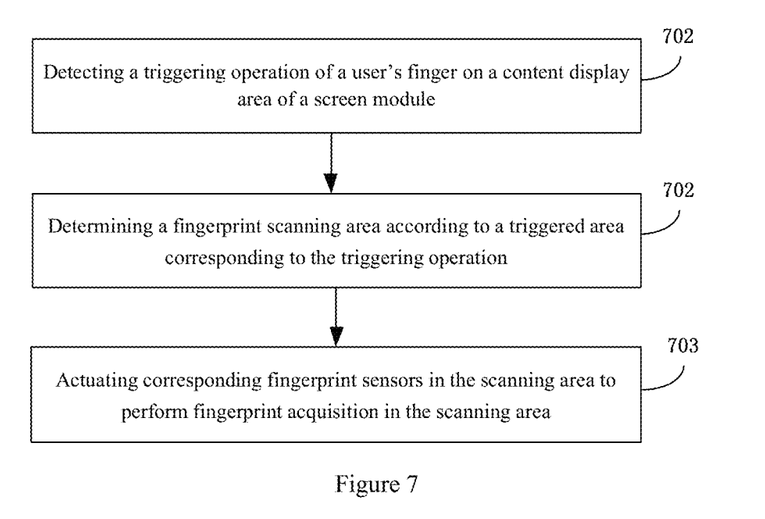
FIG. 7 is a flow chart showing a fingerprint acquisition method according to an exemplary embodiment of the present disclosure.

FIG. 7 is a flow chart showing a fingerprint acquisition method according to an exemplary embodiment of the present disclosure. As shown in FIG. 7, the method is applied to a screen module described in any of the above embodiments, and may include the following steps.

In step 701, a triggering operation of a user's finger on a content display area of the screen module is detected.

In an embodiment, a triggering detection structure may be arranged in the screen module to detect the triggering operation of a user with respect to the screen module and to determine a corresponding triggered area. As an exemplary embodiment, if the screen module comprises a touch function component, the touch function component may be used as the triggering detection structure to detect a touch operation of the user with respect to the screen module. For example, the touch function component may comprise a touch screen as well as corresponding transmission lines and a corresponding control chip. As another exemplary embodiment, if the screen module comprises a pressure detection component, the pressure detection component may be used as the triggering detection structure to detect a pressing operation of the user with respect to the screen module. For example, the pressure detection component may comprise pressure sensors as well as corresponding transmission lines and a corresponding control chip. Of course, both the touch function component and the pressure detection component described above are for illustrative purpose, and it is apparent that the triggering detection structure can also be implemented by other structures, which will not be limited by the present disclosure.

In step 702, a fingerprint scanning area is determined according to the triggered area corresponding to the triggering operation.

In an embodiment, a scanning area in which fingerprint sensors of the fingerprint unit are to be actuated can be determined based on a size of the finger, so that partial scanning of the fingerprint sensors is realized and the power consumption of the fingerprint unit is reduced.

In step 703, corresponding fingerprint sensors in the scanning area are actuated to perform fingerprint acquisition in the scanning area.

Also, as shown in FIGS. 4 and 5, numerous fingerprint sensors are arranged in a content display area 10 to form a rectangular array with a large area. Detecting the triggering operation of a user by a triggering detection structure may be implemented simply by switching the fingerprint sensors in a scanning area 14 in the rectangular array to an actuated state during the existence of the triggering operation, and switching the fingerprint sensors back to a normally-closed state after the triggering operation disappears. As such, the power consumption of the fingerprint unit can be reduced to the greatest extent while ensuring realization of fingerprint acquisition in the scanning area.

In the present embodiment, by sequentially controlling the switches for the fingerprint sensors in the scanning area, the number of actuated fingerprint sensors is reduced, and times for actuating the fingerprint sensors are shortened.

Figure 8:
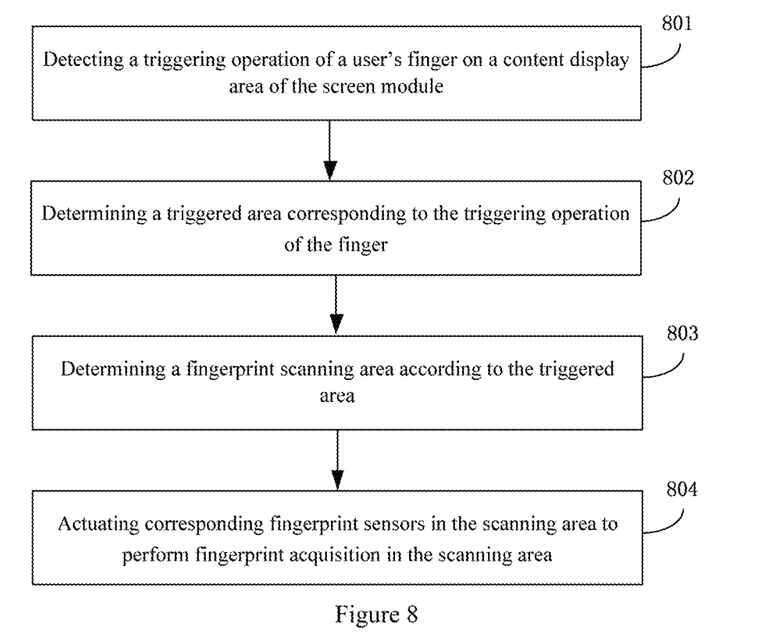
FIG. 8 is a flow chart showing a fingerprint acquisition method according to another exemplary embodiment of the present disclosure.

FIG. 8 is a flow chart showing a fingerprint acquisition method according to another exemplary embodiment of the present disclosure. The present embodiment is illustrated on a premise that a fingerprint recognition module has been actuated by a system of a mobile device. As shown in FIG. 8, the fingerprint acquisition method includes the following steps.

In step 801, a triggering operation of a user's finger on a content display area of a screen module is detected.

Related description of the above step 701 may be referred to for the description of step 801, which will not be elaborated herein.

In step 802, a triggered area corresponding to the triggering operation of the finger is determined.

In an embodiment, the triggered area may be a contact area between the finger and the content display area.

In step 803, a fingerprint scanning area is determined according to the triggered area.

In an embodiment, the triggered area may be magnified by a preset magnification to obtain the fingerprint scanning area. In another embodiment, the preset magnification may be calculated by statistically processing contact areas of fingers of a larger number of users. Through the preset magnification, a contact area may be magnified to a circular area capable of covering the contact area. Tangential lines of the circular area in the first edge direction and the second edge direction are determined to obtain a scanning area 14 enclosed by rectangular edges.

In step 804, corresponding fingerprint sensors in the scanning area are actuated to perform fingerprint acquisition in the scanning area.

Further to beneficial technical effects of the above embodiments, the present embodiment determines the fingerprint scanning area based on the triggered area and the preset magnification, thereby ensuring that all fingerprint sensors corresponding to an area where a finger is located are actuated and thus ensuring the accuracy of fingerprint recognition.

Corresponding to the embodiments of the aforementioned fingerprint acquisition method, the present disclosure further provides embodiments of a fingerprint acquisition apparatus.

Figure 9:
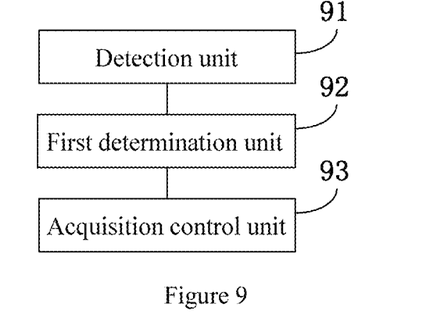
FIG. 9 is a block diagram of a fingerprint acquisition apparatus according to an exemplary embodiment of the present disclosure.

FIG. 9 is a block diagram of a fingerprint acquisition apparatus according to an exemplary embodiment of the present disclosure. As shown in FIG. 9, the fingerprint acquisition apparatus is used in a screen module described in any of the above embodiments, and includes a detection unit 91, a first determination unit 92 and an acquisition control unit 93.

The detection unit 91 is configured to detect a triggering operation of a user's finger on a content display area of the screen module.

The first determination unit 92 is configured to determine a fingerprint scanning area according to a triggered area corresponding to the triggering operation detected by the detection unit 91.

The acquisition control unit 93 is configured to actuate corresponding fingerprint sensors in the scanning area determined by the first determination unit 92 to perform fingerprint acquisition in the scanning area.

Figure 10:
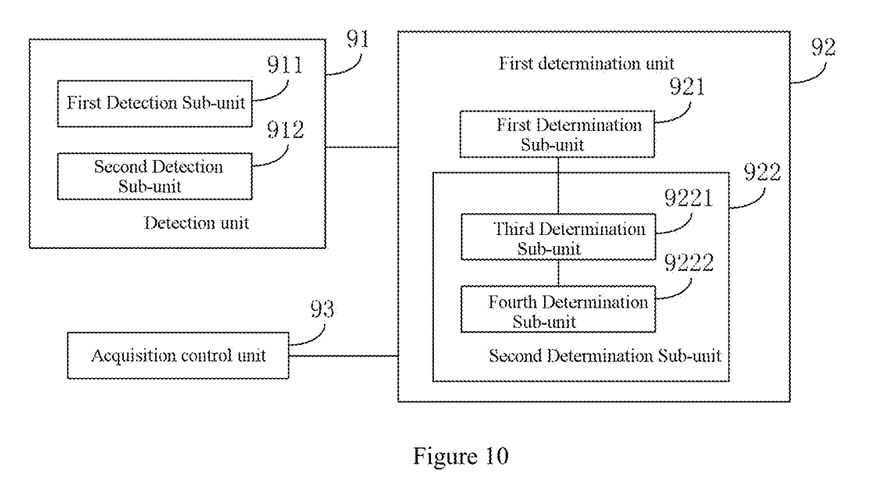
FIG. 10 is a block diagram of a fingerprint acquisition apparatus according to another exemplary embodiment of the present disclosure.

FIG. 10 is a block diagram of a fingerprint acquisition apparatus according to another exemplary embodiment of the present disclosure. As shown in FIG. 10, on the basis of the embodiment shown in FIG. 9, in the embodiment, the first determination unit 92 may comprise: a first determination sub-unit 921 configured to determine a triggered area corresponding to a triggering operation of the finger; and a second determination sub-unit 922 configured to determine a fingerprint scanning area according to the triggered area determined by the first determination sub-unit 921 and a preset magnification.

In an embodiment, the second determination sub-unit 922 may include: a third determination sub-unit 9221 configured to determine rectangular edges for fingerprint scanning according to the triggered area; and a fourth determination sub-unit 9222 configured to determine a fingerprint scanning area based on the rectangular edges determined by the third determination sub-unit 9221.

In an embodiment, the detection unit 91 may include: a first detection sub-unit 911 configured to detect a touch operation of the user with respect to the screen module via a touch function component in the screen module.

In an embodiment, the detection unit 91 may include: a second detection sub-unit 912 configured to detect a pressing operation of the user with respect to the screen module via a pressure detection component in the screen module.

With respect to the apparatuses in the above embodiments, the specific manners for individual modules therein to perform operations have been described in detail in the embodiments of the related methods, and will not be elaborated herein.

Figure 11:
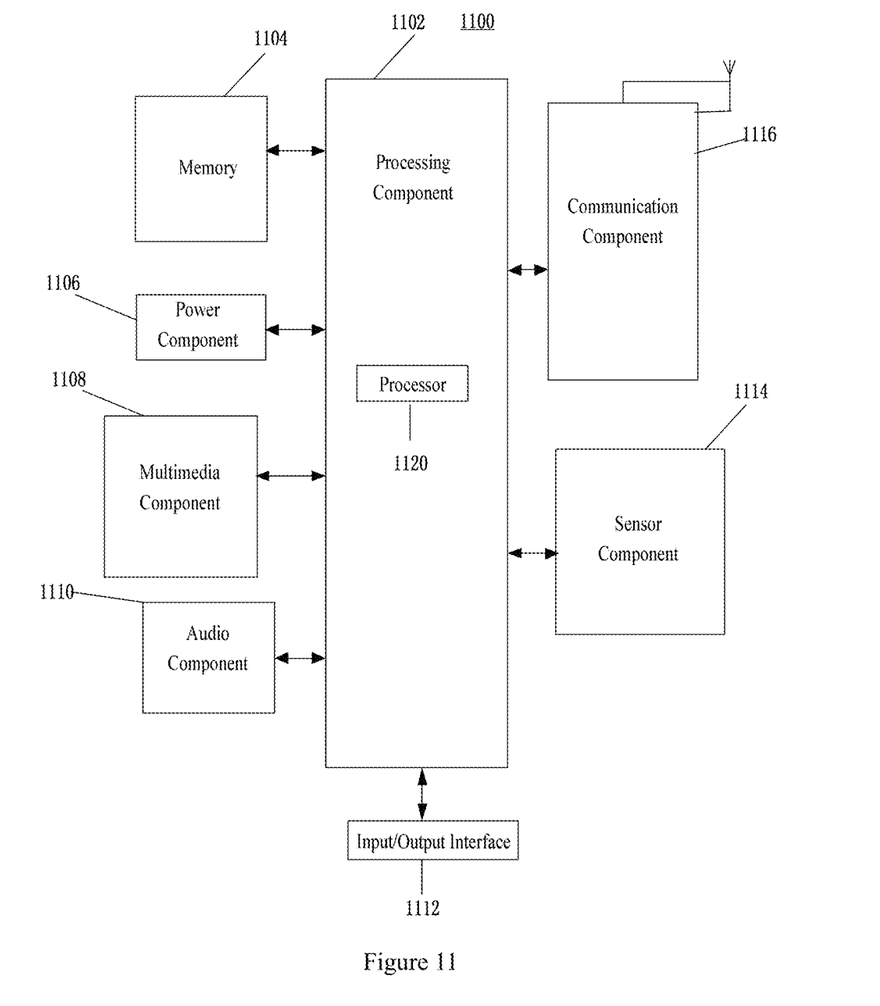
FIG. 11 shows a schematic structure diagram of a fingerprint acquisition apparatus according to an exemplary embodiment of the present disclosure.

FIG. 11 shows a schematic structure diagram of a fingerprint acquisition apparatus according to an exemplary embodiment of the present disclosure. Fox example, the apparatus 1100 may be a mobile phone, a computer, a digital broadcast terminal, a message transceiver, a game console, a tablet device, a medical device, fitness equipment, a personal digital assistant or the like.

Referring to FIG. 11, the apparatus 1100 may include one or more following components: a processing component 1102, a memory 1104, a power component 1106, a multimedia component 1108, an audio component 1110, an input/output (I/O) interface 1112, a sensor component 1114 and a communication component 1116.

The processing component 1102 typically controls overall operations of the apparatus 1100, such as the operations associated with display, telephone calls, data communications, camera operations and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For example, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with a touch or swipe action. In some embodiments, the multimedia component 1108 includes a front camera and/or a rear camera. The front camera and/or the rear camera may receive an external multimedia datum while the apparatus 1100 is in an operation mode, such as a photographing mode or a video mode. Each of the front and rear cameras may be a fixed optical lens system or have a focus and optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or a component of the apparatus 1100, a presence or absence of user's contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor or a temperature sensor.

The communication component 1116 is configured to facilitate communication, wired or wirelessly, between the apparatus 1100 and other devices. The apparatus 1100 can access a wireless network based on a communication standard, such as WiFi, 2G; or 3G; or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium comprising instructions, such as included in the memory 1104, executable by the processor 1120 in the apparatus 1100, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A screen module, comprising:
    a fingerprint unit comprising a plurality of fingerprint sensors, which are located in a content display area of the screen module and configured to perform fingerprint acquisition;
    a processing component connected with the fingerprint unit, the processing component being configured to, after a triggering operation of a user's finger on the content display area is detected, magnify a contact area between the finger and the content display area to a circular area capable of covering the contact area, determine tangential lines of the circular area along a first edge direction and a second edge direction to obtain a fingerprint scanning area enclosed by rectangular edges defined by the tangential lines, the first edge direction being perpendicular to the second edge direction, and the processing component being further configured to switch the fingerprint sensors in the fingerprint scanning area from a normally-closed state to an actuated state to perform partial scanning of a fingerprint in the fingerprint scanning area; and
    data transmission lines connected to the plurality of fingerprint sensors and the processing component, and configured to transmit the fingerprint data acquired by the fingerprint sensors in the scanning area to the processing component;
    wherein the triggering operation is detected by a triggering detection structure, and the triggering detection structure is different from the fingerprint sensor.

2. The screen module of claim 1, further comprising:
    an LCD display module, wherein
    projections of the plurality of fingerprint sensors in a vertical direction fall within projections of BM areas in sub-pixels of the LCD display module in the vertical direction.

3. The screen module of claim 2, wherein the plurality of fingerprint sensors are arranged on a surface of a color filter of the LCD display module and correspond to a plurality of sub-pixels on the color filter respectively.

4. The screen module of claim 1, further comprising:
    gating control lines, one ends of which are connected to the plurality of fingerprint sensors and the other ends of which are connected to a control component, wherein
    the gating control lines are configured to control fingerprint sensors in the scanning area to be connected or disconnected with data transmission lines corresponding to the fingerprint sensors in the scanning area according to control instructions from the control component.

5. The screen module of claim 4, wherein output ends of the fingerprint sensors are connected to the data transmission lines corresponding to switches via the switches, and the gating control lines are connected to control ends of the switches.

6. The screen module of claim 4, wherein
    each row of fingerprint sensors arranged in a first edge direction of the screen module are connected to a data transmission line corresponding to the row of fingerprint sensors arranged in the first edge direction; and
    each line of fingerprint sensors arranged in a second edge direction of the screen module are connected to a gating control line corresponding to the line of fingerprint sensors arranged in the second edge direction, the first edge direction being perpendicular to the second edge direction.

7. The screen module of claim 1, further comprising:
    a triggering detection structure configured to detect a triggering operation of a user's finger on the content display area and a scanning area corresponding to the triggering operation, wherein
    when the triggering detection structure detects the triggering operation, fingerprint sensors in the scanning area are switched from a normally-closed state to an actuated state.

8. The screen module of claim 7, wherein the triggering detection structure comprises a touch function component, and the triggering operation is a touch operation detected by the touch function component.

9. The screen module of claim 7, wherein the triggering detection structure comprises a pressure detection component, and the triggering operation is a pressing operation detected by the pressure detection component.

10. A fingerprint acquisition method applied to a screen module according to claim 1, the method comprising:
    detecting a triggering operation of a user's finger on a content display area of the screen module;
    magnifying a contact area between the finger and the content display area to a circular area capable of covering the contact area;
    determining tangential lines of the circular area along a first edge direction and a second edge direction to obtain a fingerprint scanning area enclosed by rectangular edges defined by the tangential lines, the first edge direction being perpendicular to the second edge direction; and
    switching a fingerprint sensor in the fingerprint scanning area from a normally-closed state to an actuated state to perform partial scanning of a fingerprint in the fingerprint scanning area;
    wherein the triggering operation is detected by a triggering detection structure, and the triggering detection structure is different from the fingerprint sensor.

11. The method of claim 10, wherein detecting the triggering operation of the user on the content display area of the screen module comprises:
    detecting a touch operation of the user with respect to the screen module via a touch function component in the screen module.

12. The method of claim 10, wherein detecting the triggering operation of the user on the content display area of the screen module comprises:
    detecting a pressing operation of the user with respect to the screen module via a pressure detection component in the screen module.

13. An electronic device, comprising:
    a processor; and
    a memory configured to store instructions executable by the processor,
    wherein the processor is configured to:
    detect a triggering operation of a user's finger on a content display area of the screen module;
    magnify a contact area between the finger and the content display area to a circular area capable of covering the contact area;
    determine tangential lines of the circular area along a first edge direction and a second edge direction to obtain a fingerprint scanning area enclosed by rectangular edges defined by the tangential lines, the first edge direction being perpendicular to the second edge direction; and
    switch a fingerprint sensor in the fingerprint scanning area from a normally-closed state to an actuated state to perform partial scanning of a fingerprint in the fingerprint scanning area;

wherein the triggering operation is detected by a triggering detection structure, and the triggering detection structure is different from the fingerprint sensor.

14. The electronic device according to claim 13, wherein detecting the triggering operation of the user on the content display area of the screen module comprises:
   detecting a touch operation of the user with respect to the screen module via a touch function component in the screen module.

15. The electronic device according to claim 13, wherein detecting the triggering operation of the user on the content display area of the screen module comprises:
   detecting a pressing operation of the user with respect to the screen module via a pressure detection component in the screen module.

* * * * *